(12) United States Patent
Wabnig et al.

(10) Patent No.: US 10,601,507 B2
(45) Date of Patent: Mar. 24, 2020

(54) OPTICAL LINK ESTABLISHMENT

(71) Applicant: Nokia Technologies Oy, Espoo (FI)

(72) Inventors: Joachim Wabnig, Upper Cambourne (GB); Antti Niskanen, Cambridge (GB); Hongwei Li, Cambridge (GB); David Bitauld, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 15 days.

(21) Appl. No.: 14/779,219

(22) PCT Filed: Mar. 25, 2013

(86) PCT No.: PCT/IB2013/052366
§ 371 (c)(1),
(2) Date: Sep. 22, 2015

(87) PCT Pub. No.: WO2014/155149
PCT Pub. Date: Oct. 2, 2014

(65) Prior Publication Data
US 2016/0072580 A1 Mar. 10, 2016

(51) Int. Cl.
*H04B 10/114* (2013.01)
*H04B 10/70* (2013.01)
*H04L 9/08* (2006.01)

(52) U.S. Cl.
CPC ......... *H04B 10/1143* (2013.01); *H04B 10/70* (2013.01); *H04L 9/0852* (2013.01)

(58) Field of Classification Search
CPC .................. H04B 10/11–118; H04B 10/70
See application file for complete search history.

(56) References Cited

U.S. PATENT DOCUMENTS

| 4,867,560 A | 9/1989 | Kunitsugu |
| 6,195,044 B1 * | 2/2001 | Fowell .................. B64G 1/28 342/355 |

(Continued)

FOREIGN PATENT DOCUMENTS

| GB | 2427317 A | 12/2006 |
| KR | 20120069156 A | 6/2012 |

(Continued)

OTHER PUBLICATIONS

Cobourne, "Quantum Key Distribution Protocols and Applications", Technical Report, Mar. 8, 2011, 95 pages.

(Continued)

*Primary Examiner* — Casey L Kretzer
(74) *Attorney, Agent, or Firm* — Harrington & Smith

(57) ABSTRACT

Methods and apparatuses for communication between a mobile device and a target device are disclosed. Information of a target device is determined by means of at least one element of a mobile device for providing an optical link with the target device. An optical component of the mobile device is then aligned with an optical component of the target device based on said information determined by the mobile device. The target device can obtain information of relative positioning of the target device and the mobile device determined for the purposes of providing an optical link between the target device and the mobile device and the optical component thereof can be aligned with the optical component of the mobile device based on the information.

18 Claims, 5 Drawing Sheets

(56) References Cited

U.S. PATENT DOCUMENTS

| | | | |
|---|---|---|---|
| 6,381,055 B1* | 4/2002 | Javitt | H04B 10/1123 398/131 |
| 2001/0055389 A1* | 12/2001 | Hughes | H04L 9/0858 380/44 |
| 2002/0131121 A1 | 9/2002 | Jeganathan et al. | |
| 2006/0018661 A1 | 1/2006 | Green et al. | |
| 2006/0239463 A1 | 10/2006 | Young | |
| 2007/0025551 A1* | 2/2007 | Harrison | G06Q 20/367 380/256 |
| 2009/0252499 A1* | 10/2009 | Rotgaizer | H04B 10/1123 398/131 |
| 2009/0310784 A1 | 12/2009 | Duligall et al. | |
| 2010/0080394 A1 | 4/2010 | Harrison et al. | |
| 2011/0313660 A1* | 12/2011 | Won | G01C 21/20 701/420 |
| 2012/0039617 A1 | 2/2012 | Duligall et al. | |
| 2012/0099856 A1* | 4/2012 | Britz | H04B 10/90 398/26 |
| 2012/0121247 A1* | 5/2012 | Gutierrez | G03B 3/10 396/529 |
| 2012/0177201 A1 | 7/2012 | Ayling et al. | |
| 2012/0195430 A1 | 8/2012 | Niskanen et al. | |
| 2012/0195597 A1 | 8/2012 | Malaney | |
| 2012/0218948 A1 | 8/2012 | Onggosanusi et al. | 370/329 |
| 2013/0101285 A1* | 4/2013 | Shar | H04B 10/1149 398/38 |
| 2013/0266327 A1* | 10/2013 | Bae | H04B 10/116 398/131 |
| 2014/0050472 A1* | 2/2014 | Hinderthur | H04B 10/07 398/14 |
| 2014/0248049 A1* | 9/2014 | Saint Georges | H04B 10/1125 398/25 |

FOREIGN PATENT DOCUMENTS

| | | |
|---|---|---|
| WO | 2011014184 | 2/2011 |
| WO | 2013/179094 A1 | 12/2013 |
| WO | 2014/060793 A1 | 4/2014 |

OTHER PUBLICATIONS

Extended European Search Report received for corresponding European Patent Application No. 13880466.1, dated Oct. 17, 2016, 6 pages.

International Search Report and Written Opinion received for corresponding Patent Cooperation Treaty Application No. PCT/IB2013/052366, dated Feb. 6, 2014, 13 pages.

* cited by examiner

OPTICAL LINK ESTABLISHMENT

RELATED APPLICATION

This application was originally filed as PCT Application No. PCT/IB2013/052366 filed Mar. 25, 2013.

This disclosure relates to communications in free space and more particularly to establishment of optical links between devices.

A communication link can be provided between two or more devices such as fixed and/or mobile communication devices, base stations and other access points, servers, machine type devices, and so on. Communications may occur in free space over wireless connections. An example of communications in free space is information transfer using light as the physical mechanism. Optical links can be provided for communication of various types of information, for example for communications of control and user information and/or for security applications. In accordance with a possibility quantum cryptographic keys are transmitted using optical links. For example, it is possible to transmit quantum keys over a free-space link using a laser-based quantum key distribution (QKD) system. It is also possible to provide other types of communications with directed laser beams.

Optical information transfer is conventionally enabled by fibre optics. A light signal can be sent between nodes because of total internal reflection of the fibre optics keeps the signal confined. Free-space communication can be provided e.g. based on laser beams. However, optical links are not widely used for wireless communications as they require directing light from node A to node B with high efficiency. A challenge in information transfer in association with e.g. a handheld device is to steer a laser beam or other optical beam over a range of e.g. a few meters to a target device. An established link should also be stable for a certain period of time, typically up to a few seconds for key exchange applications.

In "classical" information transfer between devices the losses can be relatively high, e.g. tens of dB if a finite signal-to-noise ratio is maintained. However, low loss transmission is desirable. In quantum communication it is particularly desirable to have relatively low losses, typically only a few dBs. This would be desirable e.g. for applications where the optical link is used for providing security such as for example quantum key distribution (QKD) enhanced WiFi/wireless local area network (WLAN), near field communications (NFC) or banking and/or direct high speed data transfer.

It is noted that the issues discussed here are not limited to any particular communication environments and apparatus but may occur in any context where steering of communication links might be needed.

Embodiments of the invention aim to address one or several of the above issues.

In accordance with an aspect there is provided a method for communications, comprising determining information of a target device by means of at least one element of a mobile device for providing an optical link with the target device, and aligning an optical component of the mobile device with an optical component of the target device based on the information determined by the mobile device.

In accordance with an aspect there is provided a method for communications, comprising obtaining information of relative positioning of a target device and a mobile device determined for the purposes of providing an optical link between the target device and the mobile device, and aligning an optical component of the target device with an optical component of the mobile device based on the information.

In accordance with an aspect there is provided an apparatus comprising at least one processor, and at least one memory including computer program code, the at least one memory and the computer program code being configured to, with the at least one processor, cause the apparatus at least to process information determined by an element of a mobile device for providing an optical link between the mobile device and a target device and to align an optical component of the mobile device with an optical component of the target device based on said information.

In accordance with an aspect there is provided an apparatus comprising at least one processor, and at least one memory including computer program code, the at least one memory and the computer program code being configured to, with the at least one processor, cause the apparatus at least to process information of relative positioning of a target device and a mobile device, the information being determined for the purposes of providing an optical link between the target device and the mobile device, and to align an optical component of the target device with an optical component of the mobile device based on the information.

In accordance with a more detailed aspect information of the target device is determined by means of at least one of a touch screen and a digital camera of the mobile device. The determining may comprise use of image recognition.

The optical component of the mobile device or the target device can comprise at least one of an emitter of a laser beam and a detector of a laser beam.

Information relating to orientation of the mobile device relative to the target device can be determined. Steering an optical beam can be provided based on the determined orientation information. The steering may comprise steering the optical beam by a steering module adapted to control the direction of the optical beam in response to the determination.

Information for the aligning may be provided by at least one measurement and/or user input apparatus provided in association with the mobile device. The determining may comprise receiving information from at least one of a location system device, accelerometer, magnetometer, gyroscope, another micro electro-mechanical system (MEMS) sensor and user interface of the mobile device. Optical image stabilization may be used in association with the steering.

The alignment may be divided in two stages. A first alignment can be done using a camera and/or image recognition capability of the mobile device, and/or using user input via a touch screen in combination with augmented reality, and a second alignment can be done based on information from at least one measurement and/or user input function of the mobile device.

The optical link may be used for quantum key distribution, communication of information and/or remote control.

A device such as a mobile communication device and/or a stationary or non-stationary target device arranged to implement the embodiments is also provided.

A computer program comprising program code adapted to perform the herein described methods may also be provided. In accordance with further embodiments apparatus and/or computer program product that can be embodied on a computer readable medium for providing at least one of the above methods is provided.

It should be appreciated that any feature of any aspect may be combined with any other feature of any other aspect.

Embodiments will now be described in further detail, by way of example only, with reference to the following examples and accompanying drawings, in which.

In the following certain exemplifying embodiments are explained in the context where communications are provided on an optical link between a mobile device and a stationary terminal device. A mobile device of a user for communications is often referred to as user equipment (UE) or terminal. A mobile device for implementing the embodiments may be provided by any device provided with optical communication apparatus for communication on an optical channel. The mobile device may also be capable of sending signals to and/or receiving wireless signals on a channel provided for example by a cellular system and/or a local wireless system. Non-limiting examples of mobile devices include a mobile station (MS) such as a mobile phone or what is known as a 'smart phone', a portable computer such as a laptop, tablet or a personal data assistant (PDA) provided with wireless communication capabilities, USB sticks with wireless capabilities, modem data cards or any combinations of these or the like.

Figure 1:
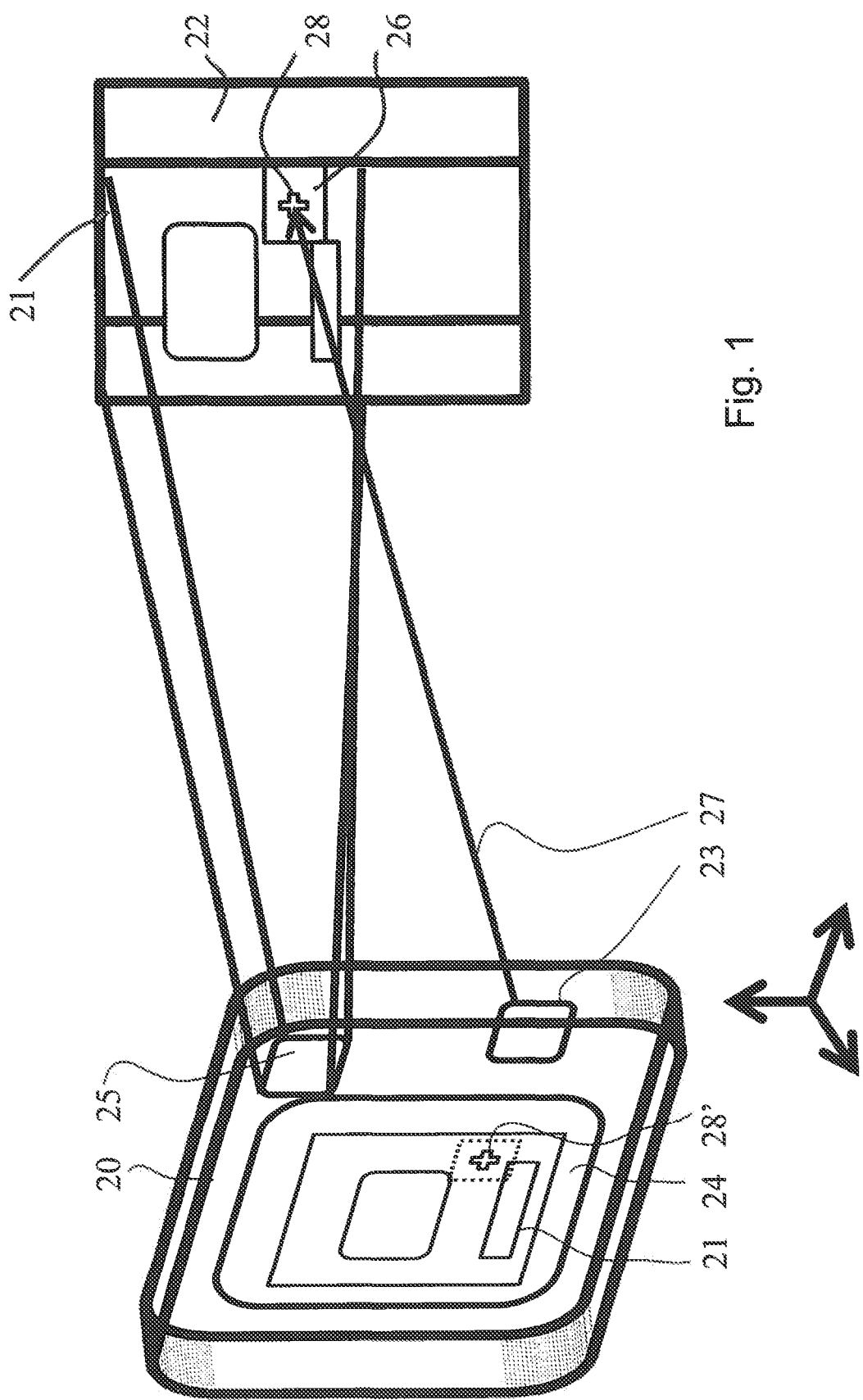
FIG. 1 shows a schematic diagram of two co-operative devices in accordance with an embodiment.

FIG. 1 shows a sender device 20, labelled terminal A, and a recipient or target device 22, labelled terminal B. In accordance with an embodiment terminal A comprises a mobile device, for example a mobile phone or a smartphone, a laptop, a notebook, a tablet computer and so forth and terminal B comprises a stationary device, for example an automated teller machine (ATM), a vending machine, a WiFi hotspot or another WLAN access point, a near field communications (NFC) terminal or any other machine type terminal capable of communicating with the mobile device 20 over an optical link there between.

A radio frequency (RF) wireless link may also be provided between devices 20 and 22, should this be required by the particular application. Both devices can be provided with a communications subsystem for the wireless communications, for example with appropriate radio apparatus to facilitate wireless communications. It is noted that a communication channel between devices 20 and 22 can also be provided based on other technologies.

Figure 2:
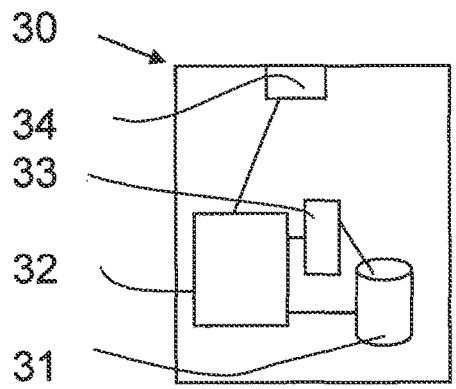
FIG. 2 shows an example of control apparatus.

Mobile devices and other devices capable of wireless communication are typically controlled by at least one appropriate controller apparatus so as to enable operation thereof and control communications between the devices and/or other parties. The control apparatus can be interconnected with other control entities. FIG. 2 shows an example of a control apparatus 30 capable of operating in accordance with the embodiments, for example to be coupled to and/or for controlling devices 20 and 22 of FIG. 1. The control apparatus can be configured to provide control functions in association with determination of various information, generation and communication of information between the various entities and/or control functions based on such information by means of the data processing facility in accordance with the certain embodiments described above. For this purpose the control apparatus comprises at least one memory 31, at least one data processing unit 32, 33 and an input/output interface 34. The control apparatus can be configured to execute an appropriate software code to provide the control functions. For example, the control apparatus can provide required functionality of the mobile device for control of the user interface, display, beam steering, transmitter, receiver, decoding/encoding and/or other functionalities devices 20 and 22 may have been provided with. The control apparatus and functions may be distributed between a plurality of control units. The data processing, storage and other relevant control apparatus may be provided on an appropriate circuit board and/or in chipsets.

Transmissions between the devices 20 and 22 may need to be secured. Examples of applications that typically rely on secure transactions over the Internet or other networks include banking, shopping, email, corporate communications, cloud computing and so on. Such communications can be open to attacks and security problems have become increasingly topical. The volume of sensitive information transmitted between various devices is increasing. Also, new applications requiring safe communications are emerging. Security of communications is thus becoming of increasing importance. The number of mobile devices that communicate over wireless interfaces is increasing which in its part increases threats on security.

Encryption with the help of quantum key distribution (QKD) is considered a way for providing security where the trust can be placed on the laws of physics rather than the complexity of computations and available computing power. The QKD is based on use of photon detectors. The efficiency of these depends on the wavelength of the received optical signal. Quantum key distribution (QKD) can be used with optical transmission channels, for example free space suitable for mobile applications, waveguides and optical fibres. An example of a possible use case of quantum key distribution is a mobile device establishing a shared key with a stationary terminal. A quantum key distribution scheme can be provided between key sender and recipient devices. At least one of the devices (transmitting party) has equipment suitable for emitting light and at least one device (receiving party) has the capability to detect light. Implementations of quantum key distribution schemes rely on sending a low number of photons, on average less than a single photon per pulse between two terminals. Distribution of keys between devices 20 and 22 for secure communications can thus be based on sending of photons from device 20 to device 22 over an optical link 27. The optical link comprises in the example a QKD and steering beam generated by an optical apparatus 23 of device 20. Apparatus 23 for generating and emitting photons can comprise an optical encoder adapted for encoding of random qubit states and emitting photons. Elements such as control electronics for creating electrical pulses needed to emit photons, a (quantum) random number generator, and a processor apparatus for controlling these components may also be provided. The apparatus for optical encoding can be adapted to probabilistically convert light pulses emitted by the light sources into photons.

At the target device 22 appropriate decoding and detector apparatus 26 is provided. Control electronics adapted for processing detector outputs and record their time trace, a communications subsystem for the wireless communication, and a computer or processor for controlling the above components can also be provided.

Optical components required to produce and transmit as well as receive and interpret optical signals (lasers, modulators, integrated optics on semiconductors and so on) are widely available.

Figure 3:
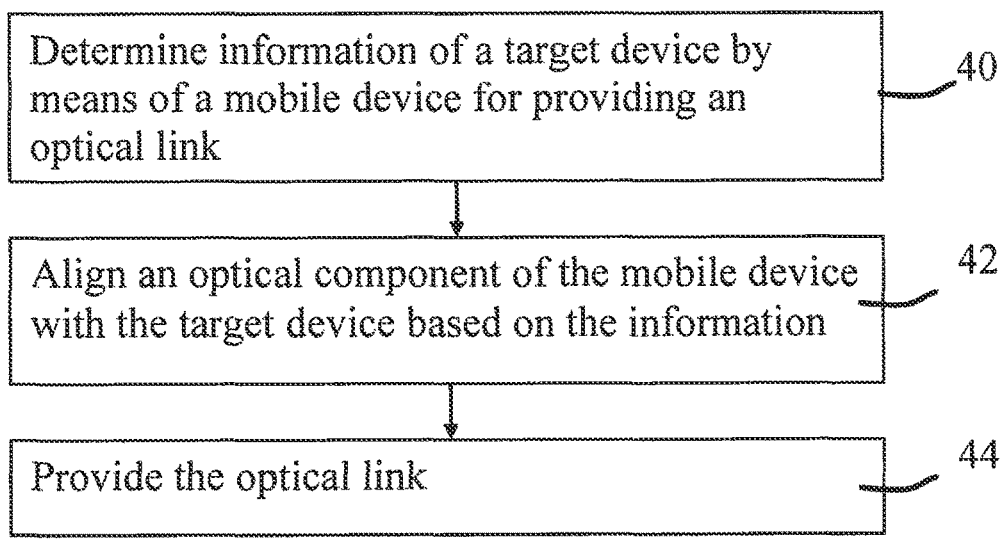
FIGS. 3 and 4 are flowcharts in accordance with certain embodiments.

In a scenario where a handheld mobile communication device would establish an optical link with a target device, for example a stationary terminal device a challenge is to steer a laser beam or other optical beam over the free space. An established link should also be stable for a certain period of time. For example, this should be so up to a few seconds for key exchange applications. In accordance with an embodiment shown in FIG. 3 this is addressed by a method at a communication device for communications where at step 40 information of the target device is determined by means of at least one element of the mobile device for the purposes of providing an optical link with the target device. More detailed examples for this are given below. The mobile device can then align at 42 an optical component thereof with an optical component of the target device based on information determined by the mobile device. The optical link can be established and/or maintained at 44 between the optical components of the respective devices.

Figure 4:
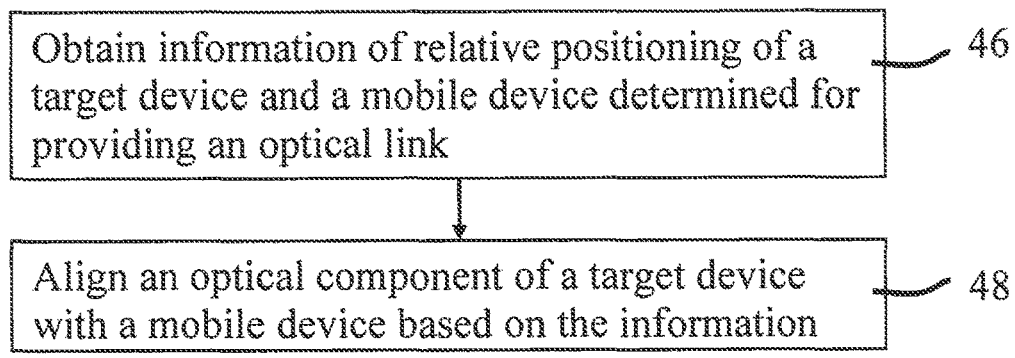

FIG. 4 illustrates a procedure at the target device end where the target device obtains at 46 information of relative positioning of the target device and the mobile device, the information being determined for the purposes of providing an optical link between the target device and the mobile device. An optical component of the target device can then be aligned at 48 with an optical component of the mobile device based on the information.

Information of the target device is determined for example by means of user input through a touch screen and/or a digital camera of the mobile device. In accordance with an example such information is used for rough steering of the beam.

In accordance with an example appropriate data that is readily available to a mobile device is used for more accurate light beam steering for QKD and/or other communications together with a steering module.

Device A and/or device B can be provided with elements that allow steering the optical beam between the devices. Beam steering hardware and software can be provided e.g. in association with data encoder and decoder to enable the beam steering. The steering may be based on use of e.g. micro-mirrors, tuneable lenses and/or phased arrays. In accordance with an example beam steering is provided by reflecting the beam off at least one movable mirror and/or by adjusting the spatial angle in which the beam is emitted to. According to a possibility at least one tuneable lens is used to adjust the focus of the emitted beam. A phased array consisting of a plurality of phase and amplitude controllable emitters can also be used for beam steering. In phased arrays constructive interference of the plurality of emitted partial beams is obtained at the target to adjust the spatial profile of an emitted wave. More than one of the above techniques can be used in combination and/or any of these can be combined with any other appropriate technique for steering an optical beam.

The data used for control of beam steering may comprise e.g. mobile location data, accelerometer, magnetometer, gyroscope data, camera data, image recognition and user input. Handheld or otherwise mobile user equipment, for example smartphones, tablets and the like, can be equipped with advanced sensors such as gyroscopes, magnetometers, accelerometers. Handheld devices can are also be made aware of their location/position through use of positioning systems, such as the assisted GPS (A-GPS). Location awareness can also be provided indoors through e.g. high accuracy indoor positioning (HAIP). More precise sensors are also expected to be available.

High quality cameras with image stabilization can be provided. The camera can be operationally connected to displays and user interface, such as a touch screen. These can be fused together to create augmented reality experiences.

It is possible to use the aforementioned features of portable devices to provide a user interface (UI) for QKD and to assist in the alignment of the QKD optics. A combination of image recognition and/or user touch or similar can be used at a first terminal device (device A) to identify/select another QKD enabled terminal (device B) with whom the mobile device, e.g. a smartphone should exchange the keys or otherwise communicate. Sensors such as micro electromechanical system (MEMS) sensors can be used to compensate for the movement of the device to aid in steering and also to identify its orientation relative to device B.

In accordance with an example a target device is provided with a recognizable alignment mark 28 of an optical component 26 that can be detected using camera 25 of mobile device 20 and appropriate image recognition algorithms. In FIG. 1 schematic example a target on the device 22 is shown as a cross 28. A laser beam 27 can be generated by an optical component 23 of the mobile device. The laser beam and an image of the target can both be visible on a display 24 of the mobile device 20 to enable a rough optical alignment directly by hand. The image 21 of the target device can be presented in its entirety. Alternatively only a part of the target device with the alignment mark 28' can be displayed on the display 24.

In accordance with an example a user can select an alignment mark or point in an augmented reality type arrangement where a camera image 21 is shown on the display 24.

Location awareness can be further utilized to help in steering the beam. If location coordinates of devices A and B are known with appropriate accuracy, this can be used to provide information about where the handheld and/or fixedly positioned device should point.

The steering mechanism can trigger a QKD key exchange protocol. A further authentication step may be performed using e.g. public key authentication or using the location data as further credentials.

Camera-based rough alignment can be used in combination with possible location data to calculate the right direction to steer to for both device A and B. MEMS sensor data can be used to compensate for the movement of the coordinate system of the mobile device to stabilize the optical link. The assembly may be provided with optical image stabilization (OIS) arrangement to further stabilize the setup. For example, a QKD module of a device together with a steering module can be mounted on an optical image stabilization (OIS) assembly.

The setup may be configured to send and detect single photons and perform quantum key distribution.

Figure 5:
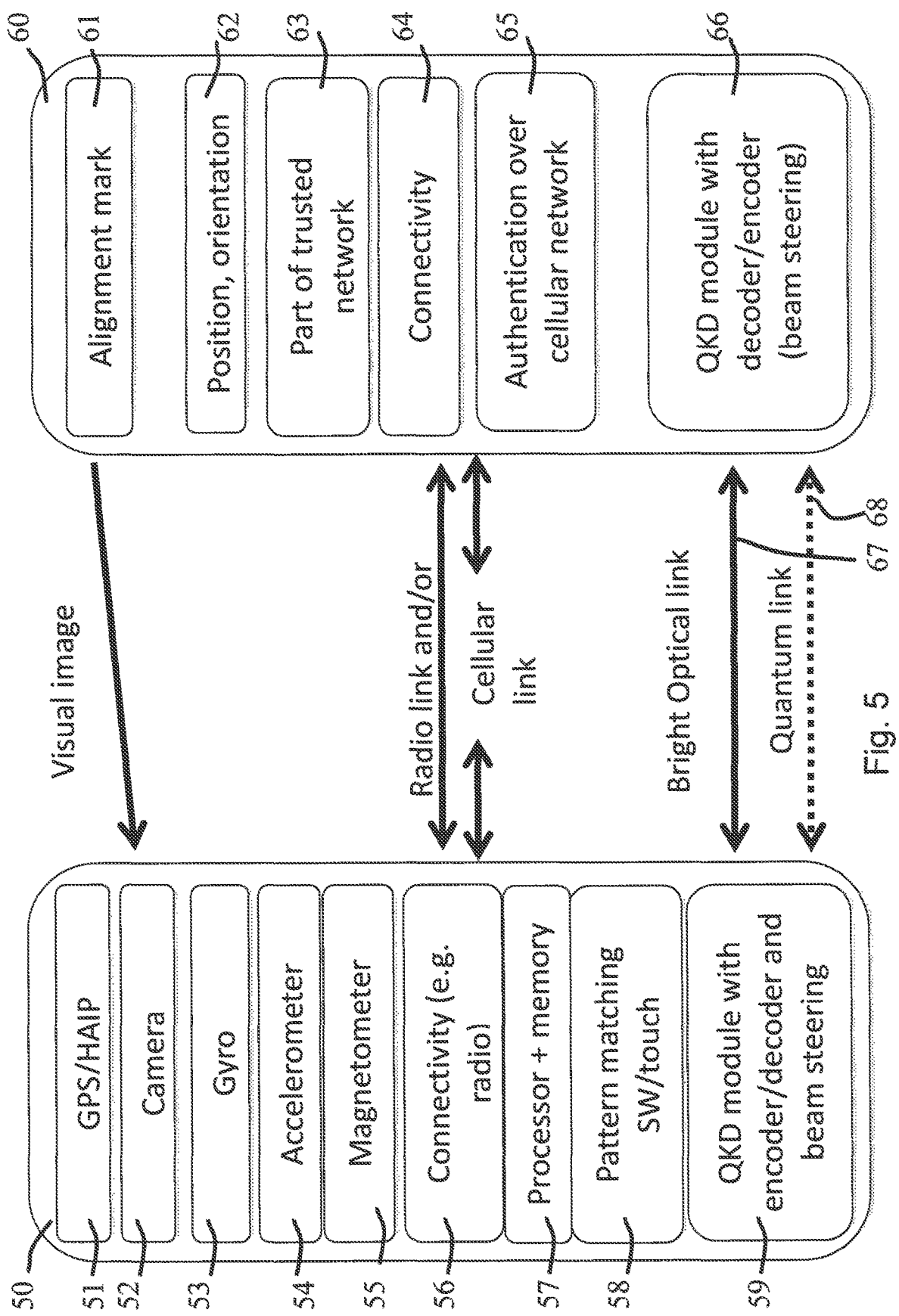
FIG. 5 shows possible elements of a user device and a target device.

More detailed examples for the various possible functions and means of a mobile device 50 and a target device 60 and communication channels there between are illustrated in the block diagram of FIG. 5. More particularly, in the example a mobile device 50 comprises a positioning function, 51, for example a GPS and/or HAIP based positioning arrangement. A camera block 52 for receiving a visual image of an alignment mark 61 on the target device 60 is also shown. Other components of device 50 for use in beam steering include a gyroscope 53, accelerometer 54 and magnetometer 55. Radio component 56 of the mobile device provides connectivity with a connectivity component 64 of the target device over a radio link. The radio link can be a cellular link, or any other radio frequency link. Data processing facility of the mobile device 50 is illustrated by processor and memory block 57. Pattern matching and/or touch screen UI functionalities are handled by block 58.

The target device can be provided with position and/or orientation function 62. If the device is a part of a trusted network, the related functions are handled at block 63. Authentication and similar processing of information transmitted over the cellular or other radio link can be handled at block 65.

Block 59 of device 50 and 66 of device 60 provides QKD module with encoding and respective decoding functions. The block also provides beam steering at mobile device 50. In applications where beam steering is also provided at the target device 60, this can be handled at block 66. In the example a visible optical beam 67 is provided between components 59 and 66 for the steering purposes. Quantum key distribution is handled over link 68 between the QKD components.

Figure 6:
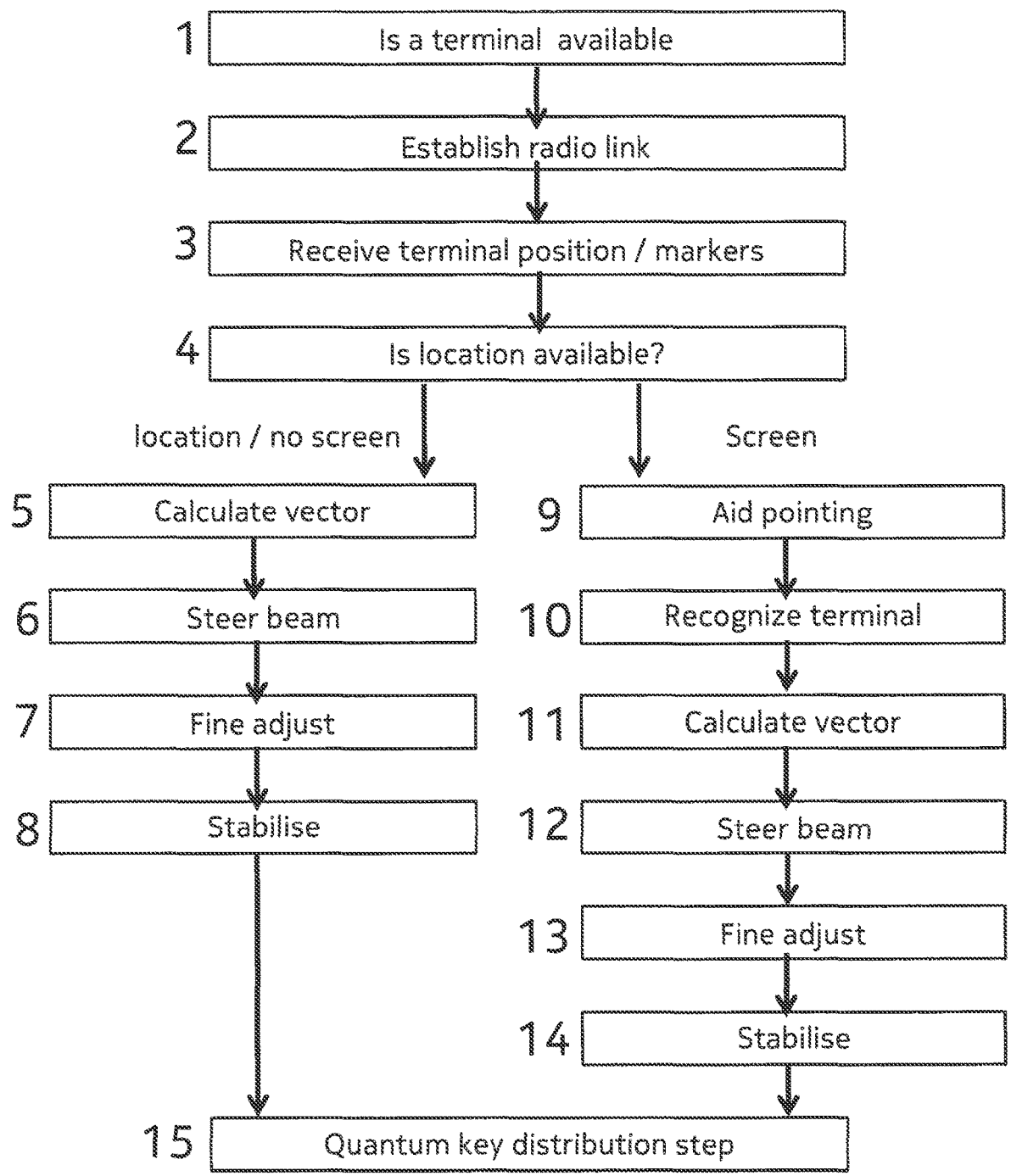
FIG. 6 shows a flowchart illustrating further examples.

Particular examples for a possible algorithm for establishing an optical link between a mobile device A and a fixed terminal B is shown in FIG. 6. At step 1 it is checked by the mobile device if a terminal is available with a line of sight connection. This can be achieved e.g. by receiving a broadcast signal from a terminal or looking for a terminal in a database. A radio link is then established with the terminal at 2. This link can also be used for the actual quantum key distribution between the devices. The exact position of the terminal is then received at 3. This enables beam steering if the location of the handheld device is also known. If image processing is used for beam steering, it can be beneficial to receive the exact shape of the alignment mark(s) on the terminal. At 4 a check is made if a highly accurate position is available for the mobile device, e.g. from HAIP or GPS. If accurate position is available, the beam steering can commence. This can be provided without further user interaction.

A vector pointing from the device to the terminal can be calculated at 5 using the location of the mobile device and the received location of the terminal. Using the orientation of the device, e.g. from sensor fusion, a direction of the beam can be calculated. If the calculated beam angles are not within the steering capabilities of the device instructions for repositioning the device manually can be displayed.

The input from step 5 can be used at step 6 to steer the beam towards the terminal. When the beam hits the terminal, fine adjustment can be provided at step 7 to establish a good quality QKD link. This can be achieved by several methods based on beam intensity measurements at the terminal and communication with the handheld device.

After a link is established sensor fusion data can be used to correct for movements of the handheld device to maintain the link. A confirmation of link establishment can be provided by the target terminal.

If no accurate position information is available at 4 an optical link can be established through interaction with a user. This is illustrated by the right hand operational path. A user interface can be displayed on the mobile device screen to aid the user in pointing the device in correct direction. To aid the pointing of the device, an approximate position can be used at 9 together with instructions on a screen.

Figure 7:
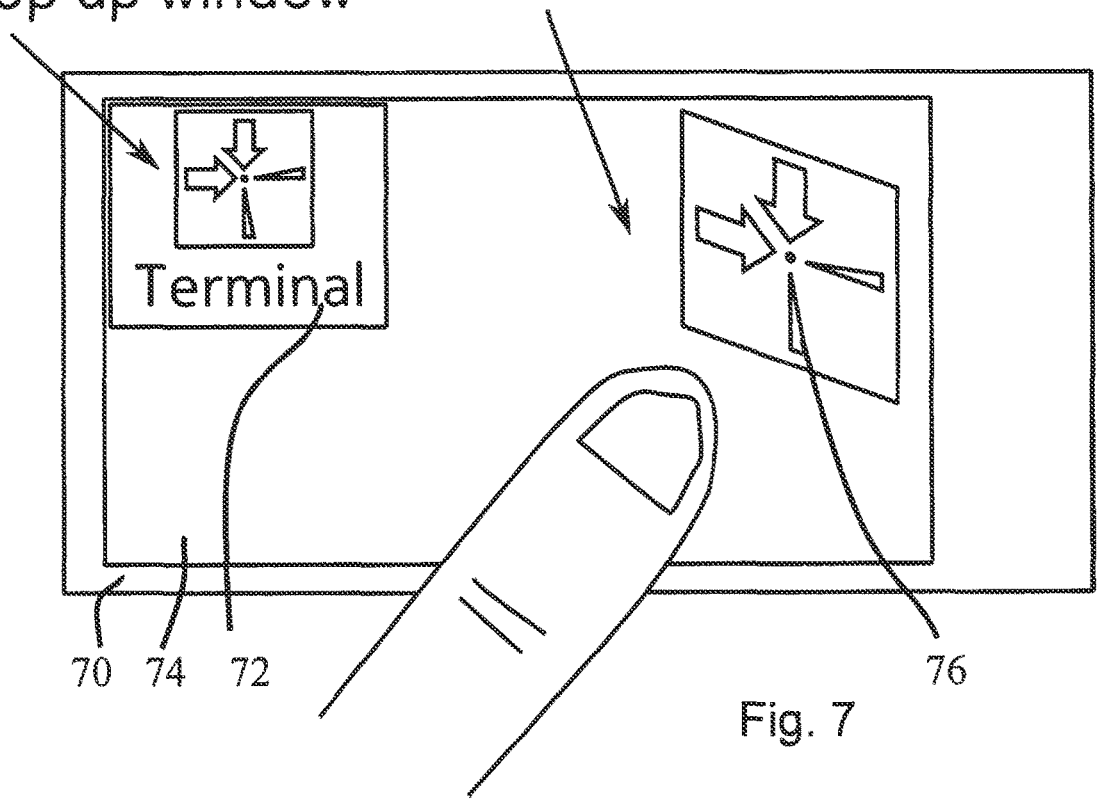
FIGS. 7 and 8 show possible user interfaces.
Figure 8:
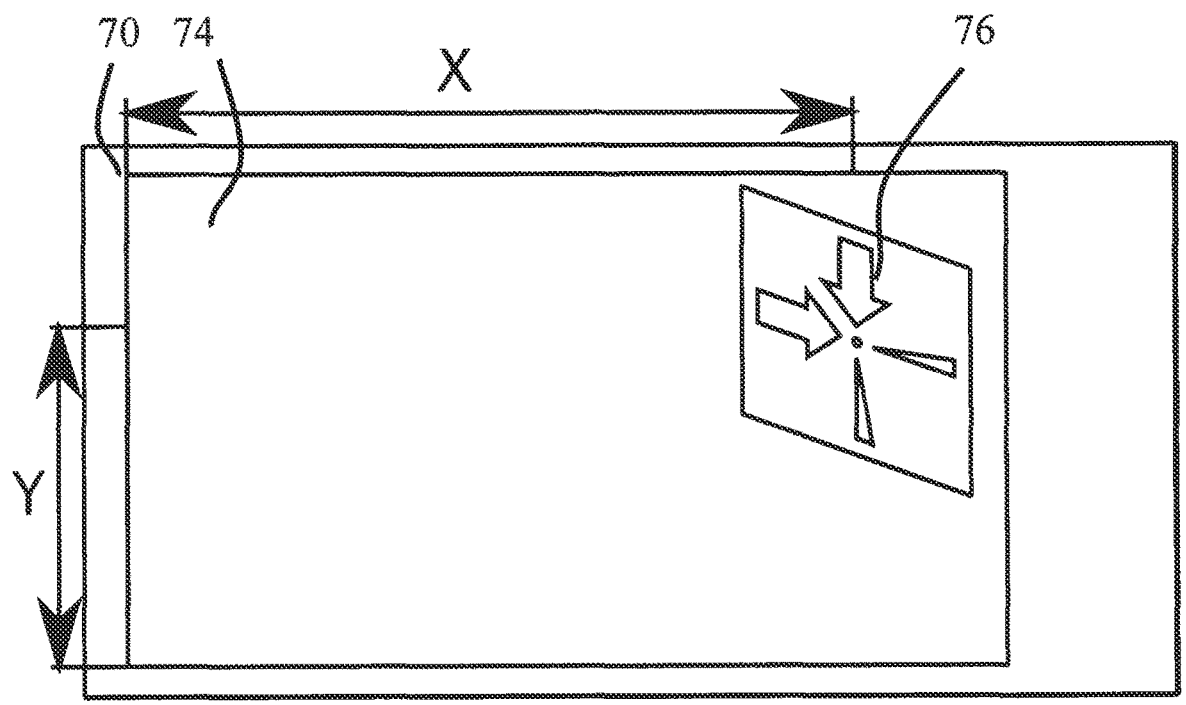

An image of the marking on the target terminal can be used to aid the finding thereof. A non-limiting example of an alignment mark 76 is shown in FIGS. 7 and 8. In the example of FIG. 7 display 74 or the handheld device displays a camera image of the alignment mark 76. Pop-up window 72 shows an image of an alignment mark. Acquisition of the position of the alignment mark can be aided by user interaction, e.g. by tracking the two images of the marks into alignment by finger or by movement of the device. In FIG. 8 example the position of an alignment mark 76 on display 74 of a handheld device 70 is translated by the processing function of the device into a vector for beam steering.

Information about the target image can be transmitted to the handheld device from the target device or elsewhere. According to a possibility predefined standard alignment mark(s) are provided.

If the target terminal is within the field of view of the camera the alignment mark can be recognised by image recognition function of the user terminal at 10. This process can be aided by the user pointing the terminal on the screen of the user device. For example, if the distance between terminal and mobile device is approximately 1 meter, a standard mobile phone camera field of view covers a sector width of about 1 meter. Assuming a resolution of 8 MP this gives a spatial resolution of about 0.3 mm. This is considered sufficient to steer the beam to the lens of the terminal. At a distance of 10 m the spatial resolution scales accordingly to 3 mm.

If the position of the target terminal within the field of view of the camera is known, the steering direction can be calculated at 11. Using the input from step 11 the beam can be steered at 12 towards the target terminal. Depending on the accuracy of the camera based alignment additional fine adjustment may be provided at 13.

If the link is established the sensor fusion data can be used to correct for movements of the handheld device to maintain the link at 14. Here an alignment mark recorded in the camera can provide additional information for the stabilisation algorithm.

After link establishment a confirmation and/or other link information may be sent from the terminal B to the handheld device A.

Once the link is established a QKD protocol can commence at 15.

An optical image stabilization (OIS) function and the beam steering function may need to be synchronised to ensure proper working of camera based alignment as the camera can move relative to the device. In an OIS device the orientation of the camera relative to the device can be time dependent and thus might not directly act as a reference for beam steering. In accordance with an example a camera is mounted on springs that are controlled using time dependent feedback so that the camera keeps pointing at the same direction even if the rigid device may "shake". This relative difference in the coordinate systems can be taken into account by the synchronisation. Another possibility is to mount the beam emitter on the camera assembly.

In the above certain embodiments were primarily related to encryption where Quantum Key Distribution (QKD) is utilised. According to an alternative for security applications another security protocol is used. However, the invention is not limited by security applications, and can be applied to other applications, for example laser based line-of-sight data transfer and selective remote control user interfaces.

According to an example appropriate apparatus or means are provided for controlling a mobile device to provide the various embodiments. Apparatus or means can be provided to determine information of a target device by integrated means of the mobile device for providing an optical link with the target device, and to align optical means of the mobile device with an optical means of the target device based on information determined by the integrated means of the mobile device.

According to yet another example appropriate apparatus or means are provided for controlling the target device to provide the various embodiments. Apparatus or means can be provided for obtaining information of relative positioning of the target device and the mobile device, the information being determined for the purposes of providing an optical link between the target device and the mobile device. The means can align optical means of the target device with optical means of the mobile device based on the information.

The means for determining can comprise at least one of a touch screen, a digital camera of the mobile device, image recognition software and hardware, software and hardware for determining information relating to the position and/or orientation of the mobile device relative to the target device, at least one measurement and/or user input apparatus provided in association with the mobile device.

The herein described embodiments may be beneficial in providing beam steering and/or stabilization based on utilization of existing capabilities of mobile devices.

It is noted that whilst embodiments have been described using a mobile communication system as an example, similar principles can be applied to any other system where optical communications beam need to be directed between communicating devices. For example, instead of communications between a mobile station and a stationary device the communications may be provided between two mobile devices, or between two at least temporarily static or semi-static devices. For example, the principles can be applied where no fixed equipment is provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions at the relevant devices may be provided by means of one or more data processors. The described functions may be provided by separate processors or by an integrated processor. The data processing apparatus may be of any type suitable to the local technical environment, and may include one or more of general purpose computers, special purpose computers, microprocessors, digital signal processors (DSPs), application specific integrated circuits (ASIC), gate level circuits and processors based on dual-core or multi-core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory, including appropriate types of random access memory (RAM) and read-only memory (ROM).

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, for example for controlling communications, user interface, and data processing, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD, and a cloud storage arrangement.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method, comprising:
processing first information, where the first information is configured to be used to establish an optical link between a mobile device and a target device;
receiving second information, where the second information comprises at least one non-camera related measurement of the mobile device;
determining orientation information relating to orientation of the mobile device relative to the target device, where the determining of the orientation information is based, at least partially, upon the received second information;
steering an optical beam based on the determined orientation information, wherein after the steering of the optical beam an additional steering adjustment is provided based on a beam intensity measurement of the optical beam; and
aligning an optical component of the mobile device with an optical component of the target device for the optical link, where the aligning is at least partially based on the orientation information determined by the mobile device;
wherein the optical link is configured to provide quantum key distribution, and wherein the determining of the orientation information comprises receiving the second information from at least one of a location system device, an accelerometer, a magnetometer, a gyroscope, or a micro electro-mechanical system sensor of the mobile device.

2. The method according to claim 1 wherein the first information is determined by means of at least one of a touch screen of the mobile device or a digital camera of the mobile device.

3. The method according to claim 2 wherein the determining of the first information comprises use of image recognition.

4. The method according to claim 1 wherein the optical component of the mobile device and the optical component of the target device comprises at least one of an emitter of a laser beam and a respective detector of the laser beam.

5. The method according to claim 1 wherein the steering comprises controlling a direction of the optical beam in response to the processing of the first information.

6. The method according to claim 1, further comprising receiving user input information from at least one user input function provided in association with the mobile device.

7. The method according to claim 6, wherein the receiving of the user input information comprises receiving the user input information from a user interface of the mobile device.

8. The method according to claim 1 further comprising use of optical image stabilization for maintaining alignment of the optical component of the mobile device with the optical component of the target device.

9. The method according to claim 1 wherein the aligning comprises:
   a first alignment using a camera and/or image recognition capability of the mobile device, or using user input via a touch screen in combination with augmented reality, and
   a second alignment based on information from the at least one non-camera related measurement of the mobile device.

10. The method according to claim 1 further comprising using the optical link for communication of information and/or remote control.

11. An apparatus comprising at least one processor, and at least one non-transitory memory including computer program code, the at least one non-transitory memory and the computer program code being configured to, with the at least one processor, cause the apparatus at least to:
   process first information determined with a touch screen and a digital camera of a mobile device, where the first information is configured to be used to establish an optical link between the mobile device and a target device;
   receive second information, where the second information comprises at least one non-camera related measurement of the mobile device;
   determine orientation information relating to orientation of the mobile device relative to the target device, where the determining of the orientation information is based, at least partially, upon the received second information;
   steer an optical beam based on the determined orientation information, wherein after the steering of the optical beam an additional steering adjustment is provided based on a beam intensity measurement of the optical beam; and
   align an optical component of the mobile device with an optical component of the target device for the optical link, where the aligning is at least partially based on the orientation information;
   wherein the optical link is configured to provide quantum key distribution, and wherein the determining of the orientation information comprises receiving the second information from at least one of a location system device, an accelerometer, a magnetometer, a gyroscope, or a micro electro-mechanical system sensor of the mobile device.

12. The apparatus according to claim 11 wherein the at least one non-transitory memory and the computer program code are configured to, with the at least one processor, cause the apparatus to process the first information in relation to the target device that has been determined with at least one of the touch screen and the digital camera of the mobile device.

13. The apparatus according to claim 11, wherein the optical component of the mobile device or the optical component of the target device respectively comprises at least one of an emitter of a laser beam or a detector of a laser beam.

14. The apparatus according to claim 11, wherein the steering is based on at least one of a micro-mirror, a tuneable lens and/or a phased array.

15. The apparatus according to claim 11, wherein the at least one non-transitory memory and the computer program code are configured to, with the at least one processor, cause the apparatus to align the optical components based on information from at least one of the location system device, the accelerometer, the magnetometer, the gyroscope, the micro electro-mechanical system sensor or a user interface of the mobile device.

16. The apparatus according to claim 11, comprising an optical image stabilization functionality.

17. The apparatus according to claim 11, wherein the at least one non-transitory memory and the computer program code are configured to, with the at least one processor, cause the apparatus to cause a first alignment based on the digital camera and/or an image recognition capability of the mobile device and/or a user input via the touch screen in combination with augmented reality, and a second alignment based on the second information from the at least one non-camera related measurement of the mobile device.

18. An apparatus comprising at least one processor, and at least one non-transitory memory including computer program code, the at least one non-transitory memory and the computer program code being configured to, with the at least one processor, cause the apparatus at least to:
   process first information of relative positioning of a target device and a mobile device, the first information being determined for providing an optical link between the target device and the mobile device;
   receive second information from at least one non-camera related measurement of the mobile device;
   determine orientation information relating to orientation of the mobile device relative to the target device, where the determining of the orientation information is based, at least partially, upon the received second information;
   steer an optical beam based on the determined orientation information, wherein after the steering of the optical beam an additional steering adjustment is provided based on a beam intensity measurement of the optical beam; and
   align an optical component of the target device with an optical component of the mobile device for the optical link, where the aligning is at least partially based on the orientation information;
   wherein the optical link is configured to provide quantum key distribution, and wherein the determining of the orientation information comprises receiving the second information from at least one of a location system device, an accelerometer, a magnetometer, a gyroscope, or a micro electro-mechanical system sensor of the mobile device.

* * * * *